May 6, 1958     C. T. SWENSON     2,833,342
CUSHIONED SEAT
Filed April 23, 1956
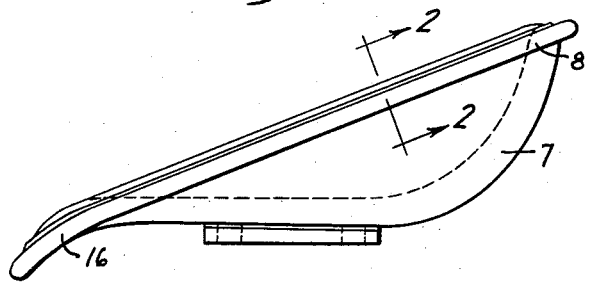
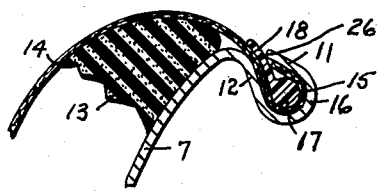
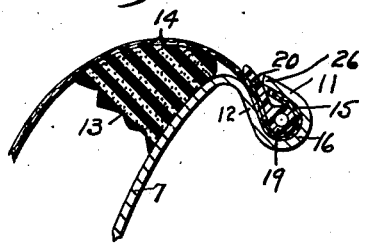
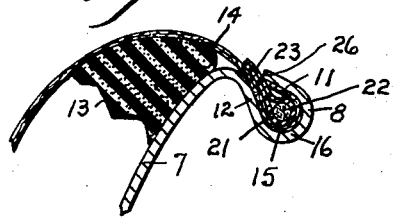
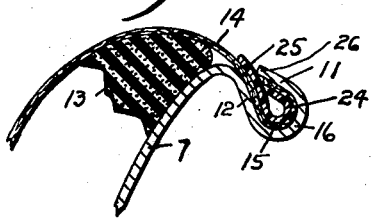
INVENTOR.
Carl T. Swenson
BY
Louis O. French
Atty.

United States Patent Office 2,833,342
Patented May 6, 1958

2,833,342

CUSHIONED SEAT

Carl T. Swenson, Milwaukee, Wis., assignor to Milsco Manufacturing Company, Milwaukee, Wis., a corporation of Wisconsin Application April 23, 1956, Serial No. 579,872

5 Claims. (Cl. 155—184)

The invention relates to cushioned seats and more particularly to seats having sheet metal body frames.

The object of the invention is to provide an improved edging construction for seats of the above type whereby the edge of the seat covering is firmly bound between a yieldable filler and the bent over edge of the frame, the filler having a tongue portion coextensive with the edge and protecting the covering from being cut or otherwise injured by the outer edge of the bent down portion of the frame.

The invention further consists in the several features hereinafter set forth and more particularly defined by claims at the conclusion hereof.

In the drawings:

Fig. 1 is a side elevation view of a seat embodying the invention;

Fig. 2 is a detailed vertical sectional view taken on the line 2—2 of Fig. 1;

Figs. 3, 4, and 5 are views similar to Fig. 2 showing certain modifications;

Fig. 6 is a detailed vertical sectional view through the edge of the seat before applying and securing the cushion thereto.

Referring to the drawings, the numeral 7 designates a seat body of stamped sheet metal of the bucket type which is deeply dished and curved for comfort and provided along its edge with a flange 8 which extends at about a right angle from the plane of the seat body and is then bent upwardly at 9 to form a curved pocket 10, and in its final position the forward side 11 of the flange is bent back toward the rear side 12 of the pocket to form a looped edge as shown in Figs. 2 to 5.

A cushioning material 13 of sponge or foam rubber or hair felt is cemented to the seat body and extends over the entire seat cavity and terminates adjacent the flanged edge of said body.

A covering 14 of any suitable flexible material such as impregnated duck canvas, heavy duck canvas, leather or imitation or artificial leather is cemented to the top of the cushioning material and has a marginal edge portion 15 that extends outwardly into the looped edge portion 16 of the body.

A compressible edge filler means coextensive with the looped edge of the body and having one side thicker than the other is secured to the edge 15 of the covering and is clamped with this edge between portions of the looped edge 16 of the body.

In Fig. 2 this edge filler means is in the form of a strip of suitable molded plastic having one side 17 formed as a cylindrical section and the other side 18 as a narrower flat section or tongue.

In Fig. 3 this edge filler means is in the form of a strip of suitable molded plastic having one side 19 formed as a hollow cylindrical section and the other side 20 as a narrower flat section or tongue.

In Fig. 4 this edge filler means is of composite form comprising a strip 21 of flexible material, such as a suitable plastic or fabric which is doubled upon itself to provide a cavity for receiving a cord 22 of yieldable material, such as rubber, hemp, cotton, or other suitable fibrous material which is held in position by heat sealing the extended portions of the strip 21 together in the case of a plastic or stitching these portions of the strip together in the case of fabric to form a tongue 23 of less thickness than the cord containing portion.

In Fig. 5 this edge filler means is a strip of flexible material such as heavy duck canvas, leather, or imitation leather which is doubled over on one edge to provide a thick or filler portion 24 at one side and a tongue portion 25 at its other side.

All of the above described forms provide a thickened loop filler strip portion and a thinner tongue strip portion.

The edge portion 15 of the covering 14 is first brought down and cemented to the sides of the flange 8 forming the open pocket 10, the covering being looped around this pocket. Then the filler strip is adhesively secured to the covering lining this pocket and its tongue portion projecting from this pocket similarly secured to the covering. Thereafter, the forward side 11 of the flange 8 is bent inwardly to bring its edge 26 in contact with the tongue portion of the filler means and squeeze this tongue and the covering between opposite sides of the looped metal edge and also to firmly engage that portion of the covering and the filler means enclosed by said looped edge of the body. Thus the edge of the covering is firmly anchored within the looped edge of the body, and it is protected from direct contact with the raw edge 26 of the metal body.

I desire it to be understood that this invention is not to be limited to any particular form or arrangement of parts except in so far as such limitations are included in the claims.

What I claim as my invention is:

1. In a seat, the combination of a sheet metal seat body having a flanged peripheral portion bent upon itself to form a downwardly inclined looped edge portion, a cushion secured to said body and extending above said flanged portion, a covering for said cushion having an extended edge portion lining and secured to the inner side of said looped edge portion, and a filler of yieldable material having a thickened portion interposed between and secured to that portion of the covering lining said looped edge portion and having a thinner portion extending beyond said looped edge portion, the outer edge of the looped edge portion of said body contacting said extended thinner portion of said filler and crimping said thinner portion and a portion of said covering between said outer edge and the opposite side of said looped edge portion.

2. In a seat, the combination of a sheet metal seat body having a flanged peripheral portion bent upon itself to form a downwardly inclined looped edge portion, a cushion secured to said body and extending above said flanged portion, a covering for said cushion having an extended edge portion lining and secured to the inner side of said looped edge portion, and a filler of yieldable material having a cylindrical portion interposed between and secured to that portion of the covering lining said looped edge portion and having a tongue portion of less thickness than said cylindrical portion extending beyond said looped edge portion, the outer edge of the looped edge portion of said body contacting said tongue portion and crimping the same and a portion of said covering between said outer edge and the opposite side of said looped edge portion.

3. The seat structure as defined in claim 2, wherein the cylindrical portion is solid and integral with said tongue portion.

4. The seat structure as defined in claim 2, wherein the cylindrical portion is a hollow tube integral with said tongue portion.

5. The seat structure as defined in claim 2, wherein the cylindrical portion has a central fibrous core portion.

References Cited in the file of this patent
UNITED STATES PATENTS

| | | |
|---|---|---|
| 2,343,505 | Gedris | Mar. 7, 1944 |
| 2,347,538 | Bloomberg | Apr. 25, 1944 |